(12) United States Patent
Xiong et al.

(10) Patent No.: US 10,104,179 B2
(45) Date of Patent: Oct. 16, 2018

(54) DATA TRANSMISSION METHOD AND SYSTEM, AND PROXY DEVICE

(71) Applicant: HUAWEI TECHNOLOGIES CO., LTD., Shenzhen (CN)

(72) Inventors: Chunshan Xiong, Beijing (CN); Lixue Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 483 days.

(21) Appl. No.: 14/836,610

(22) Filed: Aug. 26, 2015

(65) Prior Publication Data

US 2015/0365483 A1    Dec. 17, 2015

Related U.S. Application Data

(63) Continuation of application No. PCT/CN2013/071894, filed on Feb. 26, 2013.

(51) Int. Cl.
| | | |
|---|---|---|
| *H04L 29/08* | (2006.01) | |
| *H04L 29/06* | (2006.01) | |
| *H04W 80/06* | (2009.01) | |

(52) U.S. Cl.
CPC ............ *H04L 67/141* (2013.01); *H04L 29/06* (2013.01); *H04L 67/145* (2013.01); *H04L 67/28* (2013.01);
(Continued)

(58) Field of Classification Search
CPC .................................................... H04L 67/141
(Continued)

(56) References Cited

U.S. PATENT DOCUMENTS 7,076,555 B1 * 7/2006 Orman .................. G06F 11/203
    370/216
7,921,282 B1 * 4/2011 Mukerji .............. H04L 63/0428
    713/151
(Continued)

FOREIGN PATENT DOCUMENTS

| CN | 102026281 | 4/2011 |
| CN | 102355462 | 2/2012 |

(Continued)

OTHER PUBLICATIONS

International Search Report dated Dec. 5, 2013 in corresponding international application PCT/CN2013/071894.
(Continued)

*Primary Examiner* — Clarence D McCray
(74) *Attorney, Agent, or Firm* — Staas & Halsey LLP

(57) ABSTRACT

Embodiments of the present invention provide a data transmission method and system, and a proxy device. The transmission method includes: establishing a TCP connection between a client and an Internet server, where a proxy device interacts with the client in a wireless manner, and the proxy device interacts with the Internet server in a wired manner; and obtaining, by the proxy device, a start serial number and a reply serial number in a corresponding direction and completing data forwarding between the client and the Internet server based on this without respectively establishing an independent TCP connection with the client or the Internet server, so that the quality of service of a wireless network is not affected.

21 Claims, 6 Drawing Sheets

(52) U.S. Cl.
CPC .......... *H04L 67/2866* (2013.01); *H04L 67/42* (2013.01); *H04L 69/161* (2013.01); *H04L 69/163* (2013.01); *H04W 80/06* (2013.01)

(58) Field of Classification Search
USPC ........................................................ 709/203
See application file for complete search history.

(56) References Cited

U.S. PATENT DOCUMENTS

| | | | |
|---|---|---|---|
| 2003/0110279 A1* | 6/2003 | Banerjee | ................ H04L 69/16 709/232 |
| 2007/0097919 A1 | 5/2007 | Tsubota | |
| 2010/0103880 A1 | 4/2010 | Fu | |
| 2012/0054330 A1* | 3/2012 | Loach | .................... H04L 47/17 709/224 |

FOREIGN PATENT DOCUMENTS

| | | |
|---|---|---|
| EP | 2557754 | 2/2013 |
| JP | 2008-172521 | 7/2008 |
| WO | 2007/095967 A1 | 8/2007 |

OTHER PUBLICATIONS

PCT International Search Report dated Dec. 5, 2013 in corresponding International Patent Application No. PCT/CN2013/071894.
Extended European Search Report dated Jan. 18, 2016 in corresponding European Patent Application No. 13876713.2.

\* cited by examiner

DATA TRANSMISSION METHOD AND SYSTEM, AND PROXY DEVICE

CROSS-REFERENCE TO RELATED APPLICATIONS

This application is a continuation of International Application No. PCT/CN2013/071894, filed on Feb. 26, 2013, which is hereby incorporated by reference in its entirety.

TECHNICAL FIELD

Embodiments of the present invention relate to a communications technology, and in particular, to a data transmission method and system, and a proxy device.

BACKGROUND

A client establishes a Transmission Control Protocol (TCP) connection with an Internet server through a mobile communications network. The client is connected to the mobile communications network through a wireless link, while, generally, the mobile communications network is connected to the Internet server through a wired network. A time-variant characteristic of wireless links is obvious, and therefore, changes of a data transmission rate, a packet loss rate, and so on between the client and the mobile communications network over time are dramatic. In this case, a transmission policy is adjusted by using a TCP congestion control method for the wired network. However, because a transmission characteristic of a wireless network is different from that of a wired network, the TCP congestion control method put forward for the wired network is not quite applicable to the wireless network.

For the foregoing problem, a network proxy technology is put forward in the prior art, where a TCP connection between a client and an Internet server is divided into two parts: one part is a TCP connection established between the client and a network proxy and aiming at a wireless network, and the other part is a TCP connection established between the network proxy and the Internet server and aiming at a wired network. In this way, a TCP congestion control method applicable to the wireless network can be used between the client and the network proxy, and a conventional TCP congestion control method can be used between the network proxy and the Internet server. The existing network proxy technology may lower the quality of service of the wireless network, and therefore, a new data transmission technology is required.

SUMMARY

Embodiments of the present invention provide a data transmission method and system, and a proxy device, which are used to provide a technology that is different from that in the prior art and where data transmission is performed still through a proxy device.

According to a first aspect, a data transmission method is provided, including:

establishing a Transmission Control Protocol TCP connection between a first device and a second device, where the first device is a client and the second device is an Internet server, or the first device is an Internet server and the second device is a client; and a proxy device interacts with the client in a wireless manner, and the proxy device interacts with the Internet server in a wired manner;

obtaining, by the proxy device, a first direction start serial number and a first direction reply serial number that correspond to a first direction and a second direction start serial number corresponding to a second direction, where the first direction is a direction in which the first device sends data to the second device, and the second direction is a direction in which the second device sends data to the first device; the first direction start serial number is a start sequence number corresponding to start data in the first direction, and the start data in the first direction is a first piece of data cached in the proxy device last time and transmitted in the first direction; the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction; and receiving, by the proxy device, first data sent in the first direction by the first device to the second device, and updating the first direction reply serial number to an end sequence number of the first data plus 1; sending, by the proxy device, a first acknowledgement reply to the first device according to the updated first direction reply serial number and the second direction start serial number; and forwarding, by the proxy device, the first data to the second device, and updating the first direction start serial number to the first direction reply serial number.

With reference to the first aspect, in a first possible implementation manner of the first aspect, the method further includes:

obtaining, by the proxy device, a second direction reply serial number corresponding to the second direction, where the second direction reply serial number is an end sequence number, which corresponds to end data in the second direction, plus 1, and the end data in the second direction is a last piece of data cached in the proxy device last time and in the second direction; and receiving, by the proxy device, second data sent in the second direction by the second device to the first device, and updating the second direction reply serial number to an end sequence number of the second data plus 1; sending, by the proxy device, a second acknowledgement reply to the second device according to the updated second direction reply serial number and first direction start serial number; and forwarding, by the proxy device, the second data to the first device, and updating the second direction start serial number to the second direction reply serial number.

With reference to the first possible implementation manner of the first aspect, in a second possible implementation manner of the first aspect, before the updating, by the proxy device, the second direction reply serial number to an end sequence number of the second data plus 1, the method further includes: determining, by the proxy device, that a reply serial number in the second data is not the same as the second direction reply serial number.

With reference to the second possible implementation manner of the first aspect, in a third possible implementation manner of the first aspect, the determining, by the proxy device, that a reply serial number in the second data is not the same as the second direction reply serial number includes: determining, by the proxy device, whether the first data is locally cached, and if a determining result is yes, determining that the reply serial number in the second data is not the same as the second direction reply serial number.

With reference to the second possible implementation manner of the first aspect, in a fourth possible implementation manner of the first aspect, the method further includes: recording, by the proxy device, a reply serial number in the first acknowledgement reply; and the determining, by the proxy device, that a reply serial number in the second data is not the same as the second direction reply serial number includes: if the proxy device determines that the reply serial number in the first acknowledgement reply is not the same as the reply serial number in the second data, determining, by the proxy device, that the reply serial number in the second data is not the same as the second direction reply serial number.

With reference to the first possible implementation manner of the first aspect, the second possible implementation manner of the first aspect, the third possible implementation manner of the first aspect, or the fourth possible implementation manner of the first aspect, in a fifth possible implementation manner of the first aspect, the obtaining, by the proxy device, a first direction start serial number and a first direction reply serial number that correspond to a first direction and a second direction start serial number and a second direction reply serial number that correspond to a second direction includes:

when the client is handed over from a source network side device to the proxy device, receiving, by the proxy device, downlink data, and obtaining the first direction start serial number, the first direction reply serial number, the second direction start serial number, and the second direction reply serial number from the downlink data, where the downlink data includes downlink data sent by the Internet server to the client, cached in the source network side device, and forwarded by the source network side device, the source network side device is a network side device to which the client is attached before the handover, and the proxy device is a network side device to which the client is attached after the handover.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the method further includes:

when the client is handed over from the proxy device to a target network side device, sending, by the proxy device to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover.

According to a second aspect, a proxy device is provided, including:

an obtaining module, configured to obtain a first direction start serial number and a first direction reply serial number that correspond to a first direction and a second direction start serial number corresponding to a second direction, where a Transmission Control Protocol TCP connection is established between a first device and a second device, where the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction;

a receiving module, configured to receive first data sent in the first direction by the first device to the second device;

an updating module, configured to update the first direction reply serial number obtained by the obtaining module to an end sequence number of the first data received by the receiving module plus 1; and a sending module, configured to send a first acknowledgement reply to the first device according to the first direction reply serial number updated by the updating module and the second direction start serial number obtained by the obtaining module, where the sending module is further configured to forward the first data received by the receiving module to the second device; and the updating module is further configured to update the first direction start serial number obtained by the obtaining module to the first direction reply serial number.

With reference to the second aspect, in a first possible implementation manner of the second aspect, the obtaining module is further configured to obtain a second direction reply serial number corresponding to the second direction, where the second direction reply serial number is an end sequence number, which corresponds to end data in the second direction, plus 1, and the end data in the second direction is a last piece of data cached in the proxy device last time and in the second direction;

the receiving module is further configured to receive second data sent in the second direction by the second device to the first device;

the updating module is further configured to update the second direction reply serial number obtained by the obtaining module to an end sequence number of the second data received by the receiving module plus 1;

the sending module is further configured to send a second acknowledgement reply to the second device according to the second direction reply serial number updated by the updating module and the first direction start serial number obtained by the obtaining module;

the sending module is further configured to forward the second data received by the receiving module to the first device; and the updating module is further configured to update the second direction start serial number obtained by the obtaining module to the second direction reply serial number.

With reference to the first possible implementation manner of the second aspect, in a second possible implementation manner of the second aspect, the proxy device further includes: a determining module, configured to determine whether a reply serial number in the second data is the same as the second direction reply serial number.

With reference to the second possible implementation manner of the second aspect, in a third possible implementation manner of the second aspect, the determining module is specifically configured to determine whether the first data is locally cached, and if a determining result is yes, determine that the reply serial number in the second data is not the same as the second direction reply serial number.

With reference to the second possible implementation manner of the second aspect, in a fourth possible implementation manner of the second aspect, the proxy device further includes: a recording module, configured to record a reply serial number in the first acknowledgement reply, where the determining module is specifically configured to: if it is determined that the reply serial number, in the first acknowledgement reply, recorded by the recording module is not the same as the reply serial number in the second data received by the receiving module, determine that the reply serial number in the second data is not the same as the second direction reply serial number.

With reference to the first possible implementation manner of the second aspect, the second possible implementation manner of the second aspect, the third possible implementation manner of the second aspect, or the fourth possible implementation manner of the second aspect, in a fifth possible implementation manner of the second aspect, the obtaining module is specifically configured to obtain the first direction start serial number, the first direction reply serial number, the second direction start serial number, and the second direction reply serial number from downlink data that is received by the receiving module when the client is handed over from a source network side device to the proxy device, where the downlink data includes downlink data sent by the Internet server to the client, cached in the source network side device, and forwarded by the source network side device, the source network side device is a network side device to which the client is attached before the handover, and the proxy device is a network side device to which the client is attached after the handover.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the sending module is further configured to: when the client is handed over from the proxy device to a target network side device, send, to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover.

According to a third aspect, a data transmission system is provided, including: a first device, a second device, and any one of the proxy devices provided by any one possible implementation manner of the second aspect.

According to a fourth aspect, a proxy device is provided, including:

a processor, configured to obtain a first direction start serial number and a first direction reply serial number that correspond to a first direction and a second direction start serial number corresponding to a second direction, where a Transmission Control Protocol TCP connection is established between a first device and a second device, where the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction;

a receiver, configured to receive first data sent in the first direction by the first device to the second device, where the processor is further configured to update the first direction reply serial number to an end sequence number of the first data received by the receiver plus 1; and a transmitter, configured to send a first acknowledgement reply to the first device according to the first direction reply serial number updated by the processor and the second direction start serial number obtained by the processor, where the transmitter is further configured to forward the first data received by the receiver to the second device; and the processor is further configured to update the first direction start serial number to the first direction reply serial number.

With reference to the fourth aspect, in a first possible implementation manner of the fourth aspect, the processor is further configured to obtain a second direction reply serial number corresponding to the second direction, where the second direction reply serial number is an end sequence number, which corresponds to end data in the second direction, plus 1, and the end data in the second direction is a last piece of data cached in the proxy device last time and in the second direction;

the receiver is further configured to receive second data sent in the second direction by the second device to the first device;

the processor is further configured to update the obtained second direction reply serial number to an end sequence number of the second data received by the receiver plus 1;

the transmitter is further configured to send a second acknowledgement reply to the second device according to the second direction reply serial number and the first direction start serial number that are updated by the processor;

the transmitter is further configured to forward the second data received by the receiver to the first device; and the processor is further configured to update the second direction start serial number to the second direction reply serial number.

With reference to the first possible implementation manner of the fourth aspect, in a second possible implementation manner of the fourth aspect, the processor is further configured to determine whether a reply serial number in the second data is the same as the second direction reply serial number.

With reference to the second possible implementation manner of the fourth aspect, in a third possible implementation manner of the fourth aspect, the processor is specifically configured to determine whether the first data is locally cached, and if a determining result is yes, determine that the reply serial number in the second data is not the same as the second direction reply serial number.

With reference to the second possible implementation manner of the fourth aspect, in a fourth possible implementation manner of the fourth aspect, the processor is further configured to record a reply serial number in the first acknowledgement reply; and the processor is specifically configured to: if it is determined that the recorded reply serial number in the first acknowledgement reply is not the same as the reply serial number in the second data, determine that the reply serial number in the second data is not the same as the second direction reply serial number.

With reference to the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, the processor is specifically configured to obtain the first direction start serial number, the first direction reply serial number, the second direction start serial number, and the second direction reply serial number from downlink data that is received by the receiver when the client is handed over from a source network side device to the proxy device, where the downlink data includes downlink data sent by the Internet server to the client, cached in the source network side device, and forwarded by the source network side device, the source network side device is a network side device to which the client is attached before the handover, and the proxy device is a network side device to which the client is attached after the handover.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the sender is further configured to: when the client is handed over from the proxy device to a target network side device, send, to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover.

According to the data transmission method and system, and the proxy device that are provided by the embodiments of the present invention, a TCP connection is established between a client and an Internet server, where a proxy device interacts with the client in a wireless manner, and the proxy device interacts with the Internet server in a wired manner; and the proxy device obtains a start serial number and a reply serial number in a direction in which the client sends data to the Internet server and a start serial number in a direction in which the Internet server sends data to the client, or obtains a start serial number and a reply serial number in a direction in which the Internet server sends data to the client and a start serial number in a direction in which the client sends data to the Internet server, and according to the obtained start serial number and reply serial number in the corresponding direction, forwards, to the client, the data sent by the Internet server to the client or forwards, to the Internet server, the data sent by the client to the Internet server, and updates the corresponding start serial number and reply serial number, so as to implement data forwarding between the Internet server and the client. Because the proxy device does not actually establish a TCP connection separately with the client or the Internet server, data transmission is performed based on the TCP connection between the client and the Internet server, and interruption and reestablishment of the TCP connection are not involved in the data transmission process, and therefore, the quality of service of a wireless network is not affected.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
FIG. 1 is a schematic diagram of a network structure where a client accesses Internet content through a mobile communications network and on which embodiments of the present invention are based.
Figure 2A:
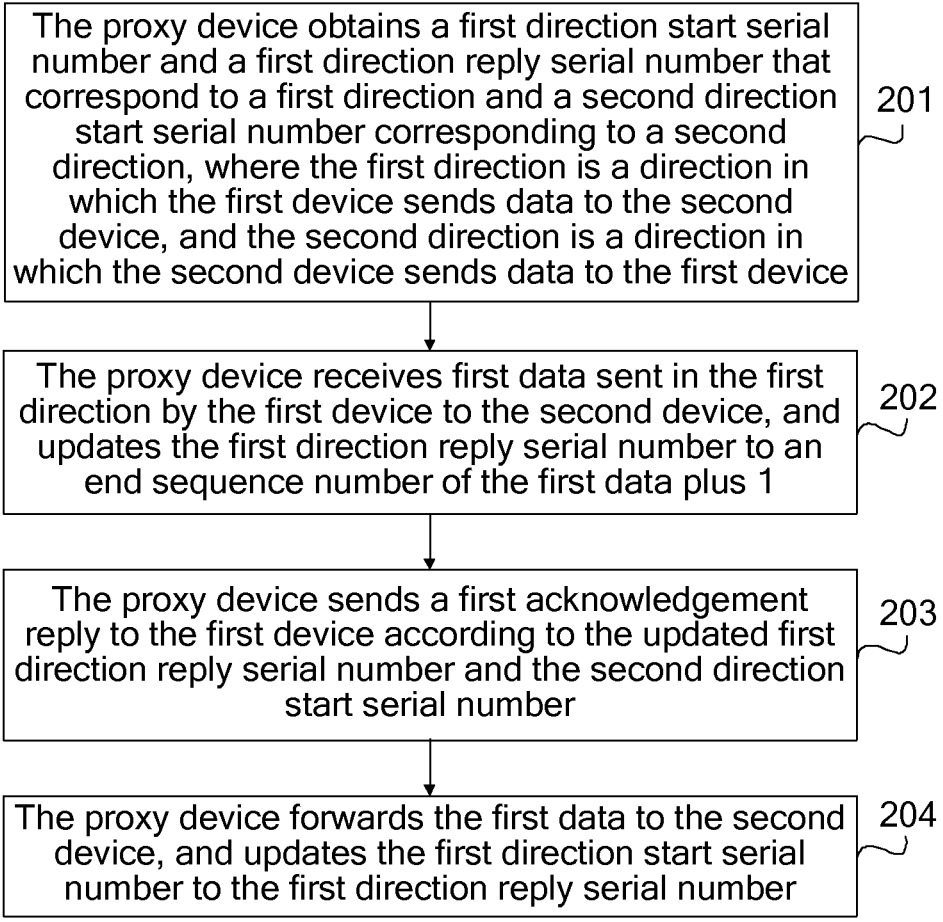
FIG. 2A is a flowchart of a data transmission method according to an embodiment of the present invention.

FIG. 1 is a schematic diagram of a network structure where a client accesses Internet content through a mobile communications network and on which embodiments of the present invention are based on. FIG. 2A is a flowchart of a data transmission method according to an embodiment of the present invention. As shown in FIG. 1, a TCP connection is established between a client and an Internet server through a mobile communications network. In this embodiment, in order not to limit the uplink or downlink, the client and the Internet server are represented by a first device and a second device, that is, a TCP connection is established between the first device and the second device, where the first device is the client, so that the second device is the Internet server, or the first device is the Internet server, so that the second device is the client. In addition, a proxy device interacts with the client in a wireless manner, and the proxy device interacts with the Internet server in a wired manner. As shown in FIG. 2A, the method in this embodiment includes:

201: The proxy device obtains a first direction start serial number and a first direction reply serial number that correspond to a first direction and a second direction start serial number corresponding to a second direction, where the first direction is a direction in which the first device sends data to the second device, and the second direction is a direction in which the second device sends data to the first device.

The first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction.

Both the data sent by the first device to the second device and the data sent by the second device to the first device carry a start serial number and a reply serial number. The start sequence number corresponding to the start data in the first direction is called the first direction start serial number, the end sequence number, which corresponds to the end data in the first direction, plus 1 is called the first direction reply serial number, and the start sequence number corresponding to the start data in the second direction is called the second direction start serial number.

In the embodiments of the present invention, the start data in the first direction is the first piece of data cached in the proxy device last time and transmitted in the first direction, and the end data in the first direction is the last piece of data cached in the proxy device last time and transmitted in the first direction. The first piece of data to the last piece of data in the first direction are cached in the proxy device and are not yet sent to the second device. After the proxy device sends the cached first piece of data to last piece of data in the first direction to the second device, and the second device acknowledges, through the TCP, that the data is received, the proxy device may delete the cached first piece of data to last piece of data in the first direction.

Similarly, in the embodiments of the present invention, the start data in the second direction is the first piece of data cached in the proxy device last time and transmitted in the second direction, and accordingly, the last piece of data cached in the proxy device last time and transmitted in the second direction is called the end data in the second direction. The first piece of data to the last piece of data in the second direction are cached in the proxy device and are not yet sent to the first device. After the proxy device sends the cached first piece of data to last piece of data in the second direction to the first device, and the first device acknowledges, through the TCP, that the data is received, the proxy device may delete the cached first piece of data to last piece of data in the second direction. Here, it should be noted that, "caching" in the embodiments of the present invention includes long-time caching, and also includes temporary caching.

In this embodiment, the client accesses the Internet server in the Internet through the mobile communications network, and the TCP connection is established between the client and the Internet server; and the proxy device in the mobile communications network interacts with the client in a wireless manner, and interacts with the Internet server in a wired manner. After the TCP connection is established between the client and the Internet server, the proxy device enables a TCP proxy function when data transmission is started or is not started, and after determining that the TCP proxy function is enabled, respectively communicates with the client and the Internet server by using the TCP connection existing between the client and the Internet server, so as to complete data forwarding between the client and the Internet server.

The foregoing mobile communications network may be a long term evolution (LTE) network, a Universal Mobile Telecommunications System (UMTS) network, a Worldwide Interoperability for Microwave Access (WiMax) network, or the like. Using the UMTS network as an example, the proxy device may be a UMTS terrestrial radio access network (UTRAN) device, a radio network controller (RNC), or the like. Using the LTE network as an example, the proxy device may be an evolved UTRAN (E-UTRAN) device, a serving gateway (SGW), a packet data network gateway (PDN GW), or the like.

202: The proxy device receives first data sent in the first direction by the first device to the second device, and updates the first direction reply serial number to an end sequence number of the first data plus 1.

The first data may be uplink data sent by the client to the Internet server, or the first data may be downlink data sent by the Internet server to the client.

After obtaining the first direction start serial number, the first direction reply serial number, and the second direction start serial number, the proxy device receives the first data sent by the first device to the second device, and updates the first direction reply serial number to the end sequence number of the first data plus 1.

Optionally, if a speed of sending the first data by the first device to the proxy device is greater than a speed of forwarding the first data by the proxy device to the second device, the proxy device may locally cache the received first data after receiving the first data sent by the first device to the second device.

203: The proxy device sends a first acknowledgement reply to the first device according to the updated first direction reply serial number and the second direction start serial number.

The proxy device, as a proxy for the second device, sends an acknowledgement reply to the first device after receiving the first data sent by the first device to the second device, and for the convenience of differentiation, here, the acknowledgement reply is called the first acknowledgement reply.

The proxy device exists between the client and the Internet server; therefore, the proxy device is responsible for caching and forwarding data between the client and the Internet server. In the forwarding process, the proxy device divides data sending between the client and the Internet server into two processing processes: one is a processing process between the proxy device and the Internet server, and the other is a processing process between the proxy device and the client. In the foregoing processing processes, the proxy device further needs to act as an agent of the client to return an acknowledgement reply to the Internet server, or act as an agent of the Internet server to return an acknowledgement reply to the client; in addition, the Internet server or the client may also send an acknowledgement reply to the proxy device. The acknowledgement reply is data exchanged between the proxy device and the client or data exchanged between the proxy device and the Internet server; therefore, the acknowledgement reply does not belong to the first data in this embodiment or the second data involved later.

204: The proxy device forwards the first data to the second device, and updates the first direction start serial number to the first direction reply serial number.

Here, it should be noted that, the first direction reply serial number in step 204 refers to the first direction reply serial number before being updated. So far, the proxy device completes forwarding of the data sent to the second device by the first device.

Figure 2B:
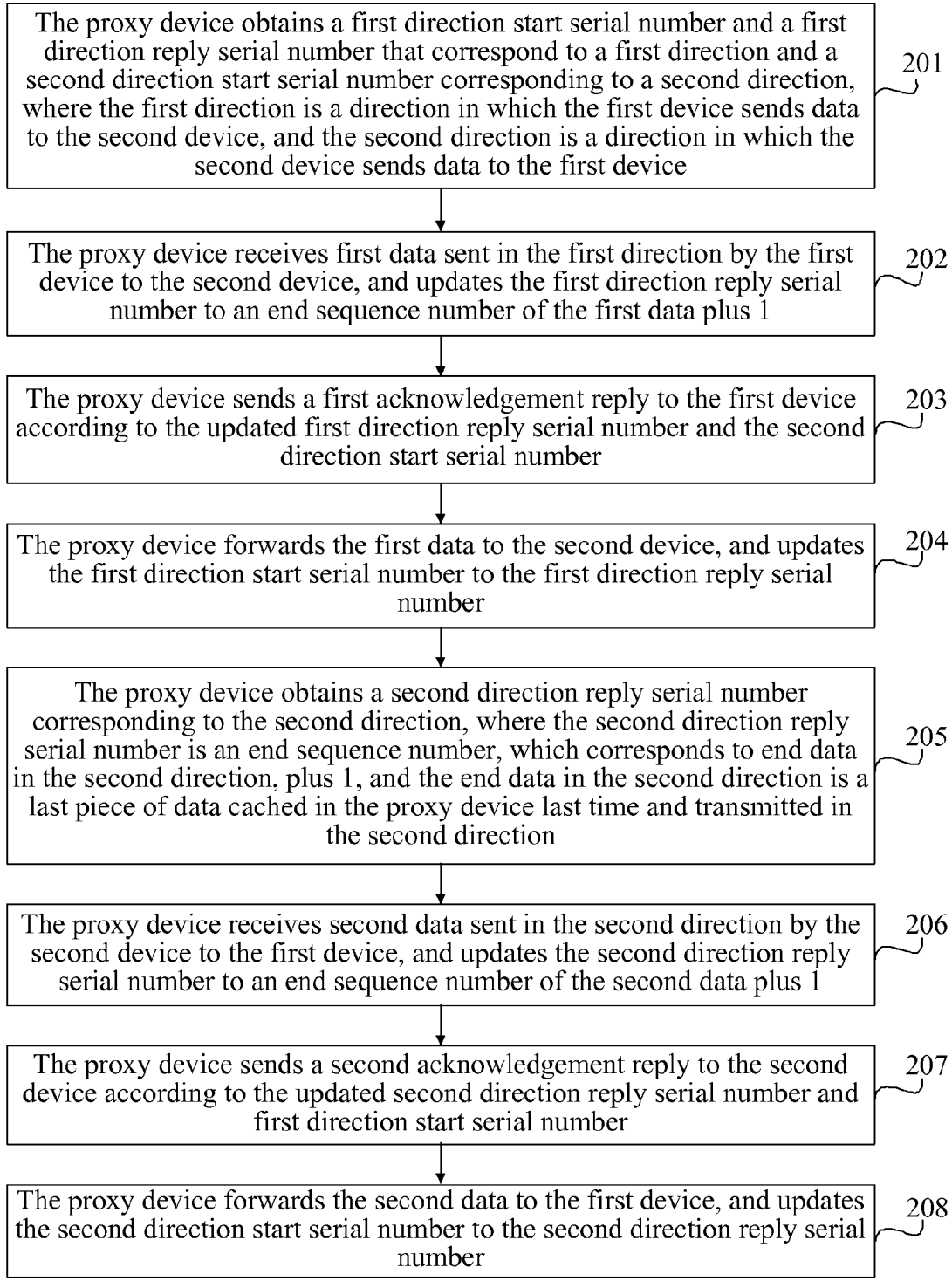
FIG. 2B is a flowchart of another data transmission method according to an embodiment of the present invention.

Further, as shown in FIG. 2B, the data transmission method provided by this embodiment further includes:

205: The proxy device obtains a second direction reply serial number corresponding to the second direction, where the second direction reply serial number is an end sequence number, which corresponds to end data in the second direction, plus 1, and the end data in the second direction is a last piece of data cached in the proxy device last time and transmitted in the second direction.

206: The proxy device receives second data sent in the second direction by the second device to the first device, and updates the second direction reply serial number to an end sequence number of the second data plus 1.

The second data may be uplink data sent by the client to the Internet server, or the second data may be downlink data sent by the Internet server to the client.

207: The proxy device sends a second acknowledgement reply to the second device according to the updated second direction reply serial number and first direction start serial number.

208: The proxy device forwards the second data to the first device, and updates the second direction start serial number to the second direction reply serial number.

Similarly, the second direction reply serial number in step 208 refers to the second direction reply serial number before being updated.

Besides receiving the first data sent by the first device to the second device and replacing the second device to return the first acknowledgement reply to the first device, the proxy device further receives the second data sent by the second device to the first device, and acts as an agent of the first device to return an acknowledgement reply to the second device, and forwards the second data to the first device, where the acknowledgement reply is called the second acknowledgement reply. The process in which the proxy device receives the second data and forwards the second data to the first device and the process in which the proxy device receives the first data and forwards the first data to the second device are independent processes.

In an optional implementation manner, the first device may not return an acknowledgement reply to the proxy device after receiving the second data sent by the proxy device.

In an optional implementation manner, the first device returns an acknowledgement reply to the proxy device after receiving the second data sent by the proxy device, where the acknowledgement reply is called a third acknowledgement reply. A start serial number in the third acknowledgement reply is the first direction reply serial number, and a reply serial number in the third acknowledgement reply is the second direction start serial number plus the length of the second data, that is, the updated second direction start serial number.

Further, the data transmission method provided by this embodiment may further include:

before updating the second direction reply serial number to the end sequence number of the second data plus 1, determining, by the proxy device, that a reply serial number in the second data is not the same as the second direction reply serial number.

Optionally, the determining, by the proxy device, that a reply serial number in the second data is not the same as the second direction reply serial number includes:

determining, by the proxy device, whether the first data (here, the first data refers to data that needs to be sent by the first device to the second device) is locally cached, and if a determining result is yes, determining that the reply serial number in the second data is not the same as the second direction reply serial number.

Further, the data transmission method provided by this embodiment further includes:

recording, by the proxy device, a reply serial number in the first acknowledgement reply. Based on this, the determining, by the proxy device, that a reply serial number in the second data is not the same as the second direction reply serial number includes:

if the proxy device determines that the reply serial number in the first acknowledgement reply is not the same as the reply serial number in the second data, determining, by the proxy device, that the reply serial number in the second data is not the same as the second direction reply serial number.

Here, it should be noted that, in different application scenarios, a manner for the proxy device to obtain the first direction start serial number and the first direction reply serial number that correspond to the first direction and the second direction start serial number and the second direction reply serial number that correspond to the second direction may be different.

For example, in an application scenario, the proxy device functions as a network side device to which the first device is currently and initially attached, and the first device establishes the TCP connection with the second device through the proxy device, so that the proxy device may record parameters in the TCP connection establishment process, and obtain the first direction start serial number, the first direction reply serial number, the second direction start serial number, and the second direction reply serial number from the recorded parameters, where the TCP connection establishment process refers to a process in which the first device establishes the TCP connection with the second device through the proxy device. The parameters recorded by the proxy device include but are not limited to: a source IP address and a destination IP address that correspond to the TCP connection, a start serial number of the data sent by the first device to the second device in the TCP connection establishment process, a start serial number of the data sent by the second device to the first device in the TCP connection establishment process, a reply serial number for the first device to give a reply, in the TCP connection establishment process, to the data sent by the second device, and a reply serial number for the second device to give a reply, in the TCP connection establishment process, to the data sent by the first device.

In another application scenario, a network side device to which the client is initially attached is a source network side device, and the proxy device is a network side device to which the client is attached after the client is handed over; and the client may function as the first device, so that the second device is the Internet server, or the client may function as the second device, so that the Internet server is the first device. The client is handed over from one serving cell to another serving cell, that is, handed over from the source network side device to the proxy device, so that the source network side device is a network side device to which the client is attached before the handover, and the proxy device is a network side device to which the client is attached after the handover. During the handover, the source network side device sends, to the proxy device, downlink data sent by the Internet server to the client and cached in the source network side device. Before the handover, the source network side device caches the downlink data sent by the Internet server to the client and not yet sent to the client; during the handover, the proxy device receives the downlink data sent by the Internet server to the client, cached in the source network side device, and forwarded by the source network side device; and after the proxy device receives the downlink data forwarded by the source network side device, the proxy device may obtain the first direction start serial number, the first direction reply serial number, the second direction start serial number, and the second direction reply serial number from the received downlink data. That is, in the application scenario, the obtaining, by the proxy device, a first direction start serial number and a first direction reply serial number that correspond to a first direction and a second direction start serial number and a second direction reply serial number that correspond to a second direction includes: when the client is handed over from the source network side device to the proxy device, receiving, by the proxy device, third data sent by the Internet server to the client, cached in the source network side device, and forwarded by the source network side device, obtaining the first direction start serial number, the first direction reply serial number, the second direction start serial number, and the second direction reply serial number from the third data forwarded by the source network side device, where the source network side device is a network side device to which the client is attached before the handover, and the proxy device is a network side device to which the client is attached after the handover.

Here, it should be noted that, in the application scenario, the source network side device may have the TCP proxy function, or may not have the TCP proxy function. If the source network side device has the TCP proxy function, the source network side device may have enabled the TCP proxy function, or may have not enabled the TCP proxy function. In this application scenario, the TCP proxy function includes but is not limited to the following functions: receiving the downlink data sent by the Internet server to the client, after the downlink data sent by the Internet server to the client is received, updating a reply serial number corresponding to end data sent by the Internet server to the client to an end sequence number, of the received downlink data, plus 1 according to the received downlink data, and sending an acknowledgement reply to the Internet server according to the updated reply serial number and a start sequence number corresponding to start data sent by the client to the Internet server, forwarding the received downlink data to the client, and updating a start sequence number corresponding to start data sent by the Internet server to the client to the end sequence number, of the received downlink data, plus 1 (that is, the foregoing updated reply serial number). Here, it should be noted that, the end sequence number of the received downlink data refers to a sequence number of a last byte in the downlink data.

In the broad sense, the TCP proxy function includes but is not limited to the following functions: receiving the first data sent in the first direction by the first device to the second device, and updating the first direction reply serial number to the end sequence number of the first data plus 1, sending the first acknowledgement reply to the first device according to the updated first direction reply serial number and the second direction start serial number, and forwarding the first data to the second device, and updating the first direction start serial number to the first direction reply serial number.

Further, optionally, if the source network side device has the TCP proxy function and has enabled the TCP proxy function, besides forwarding, to the proxy device, the downlink data not yet sent to the client, the source network side device may further send a first proxy enabling instruction to the proxy device after the proxy device obtains the first direction start serial number, the first direction reply serial number, and the second direction start serial number and before the proxy device receives the first data sent by the Internet server to the client, where the first proxy enabling instruction is used to instruct the proxy device to enable the TCP proxy function. Based on the this, after obtaining the first direction start serial number, the first direction reply serial number, and the second direction start serial number and before receiving the first data sent by the Internet server to the client, the proxy device may further receive the first proxy enabling instruction sent by the source network side device, and enable the TCP proxy function according to the first proxy enabling instruction.

Besides enabling the TCP proxy function according to the first proxy enabling instruction sent by the source network side device, the proxy device may further determine, according to a parameter such as a quality-of-service class identifier (QoS Class Identifier, QCI for short) corresponding to the TCP connection between the client and the Internet server, to enable the TCP proxy function, for example, the proxy device provides the TCP proxy function for a TCP connection in a bearer at some QCI levels, so that, when a QCI level of a bearer where the TCP connection between the client and the Internet server is located meets a requirement for enabling the TCP proxy function, the proxy device determines to enable the TCP proxy function. Alternatively, the proxy device may directly enable the TCP proxy function, that is, when not obtaining an explicit TCP proxy enabling instruction from the source network side device, without viewing a relevant parameter such as the QCI, the proxy device may immediately and unconditionally enable the TCP proxy function for a client handed over to a network where the proxy device is located.

Further, the data transmission method provided by this embodiment may further include:

when the client is handed over from the proxy device to a target network side device, sending, by the proxy device to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover. For example, the TCP connection between the client and the Internet server may be established through the proxy device, and the client is handed over from the proxy device to the target network side device.

In the application scenario, the target network side device may have the TCP proxy function, or may not have the TCP proxy function. If the target network side device has the TCP proxy function, the target network side device may have enabled the TCP proxy function, or may have not enabled the TCP proxy function. If the target network side device has and has enabled the TCP proxy function, the process in which after receiving the downlink data sent by the Internet server to the client and forwarded by the proxy device, the target network side device forwards the received downlink data is the same as the process in which the proxy device forwards the first data or the second data in this embodiment, which is not repeated herein again. If the target network side device does not have the TCP proxy function, or has the TCP proxy function but has not enabled the TCP proxy function, the target network side device may function as a relay device to directly forward the receive downlink data and forward an acknowledgement reply that is returned by the client for the received downlink data.

Further, if the uplink data sent by the client to the Internet server is still cached in the proxy device during the handover, the proxy device may forward all the cached uplink data to the Internet server before the handover. For details about the process in which the proxy device forwards the uplink data to the Internet server before the handover, reference may be made to the foregoing process in which the proxy device forwards the first data to the second data, which is not repeated herein again.

In an optional implementation manner, the target network side device may have the TCP proxy function by default, for example, when the client is handed over from the proxy device to the target network side device, besides sending, to the target network side device, downlink data sent by the Internet server to the client and still cached in the proxy device, the proxy device may further send a second proxy enabling instruction to the target network side device, where the second proxy enabling instruction is used to instruct the target network side device to enable the TCP proxy function.

As can be seen from the foregoing, the proxy device in this embodiment maintains the first direction start serial number and the first direction reply serial number in the first direction and the second direction start serial number corresponding to the second direction; and each time the proxy device receives one piece of data or send one data packet, the proxy device needs to update the first direction reply serial number and the second direction start serial number corresponding to the second direction. Specifically, the proxy device receives the first data sent in the first direction by the first device to the second device, and updates the first direction reply serial number; and the proxy device forwards the first data to the second device, and updates the first direction start serial number. Further, the proxy device further maintains the second direction reply serial number in the second direction; the proxy device receives the second data sent in the second direction by the second device to the first device, and updates the second direction reply serial number; and the proxy device forwards the second data to the second device, and updates the second direction start serial number.

In this embodiment, a TCP connection is established between a client and an Internet server, where a proxy device interacts with the client in a wireless manner, and the proxy device interacts with the Internet server in a wired manner; and the proxy device obtains a start serial number and a reply serial number in a direction in which the client sends data to the Internet server and a start serial number in a direction in which the Internet server sends data to the client, or obtains a start serial number and a reply serial number in a direction in which the Internet server sends data to the client and a start serial number in a direction in which the client sends data to the Internet server, and according to the obtained start serial number and reply serial number in the corresponding direction, forwards, to the client, the data sent by the Internet server to the client or forwards, to the Internet server, the data sent by the client to the Internet server, and updates the corresponding start serial number and reply serial number, so as to implement data forwarding between the Internet server and the client. Because the proxy device does not actually establish a TCP connection separately with the client or the Internet server, data transmission is performed based on the TCP connection between the client and the Internet server, and interruption and reestablishment of the TCP connection that are caused by the mobility of the client are not involved in the data transmission process, and therefore, the data transmission is not interrupted and the quality of service of a wireless network is not affected.

Figure 3:
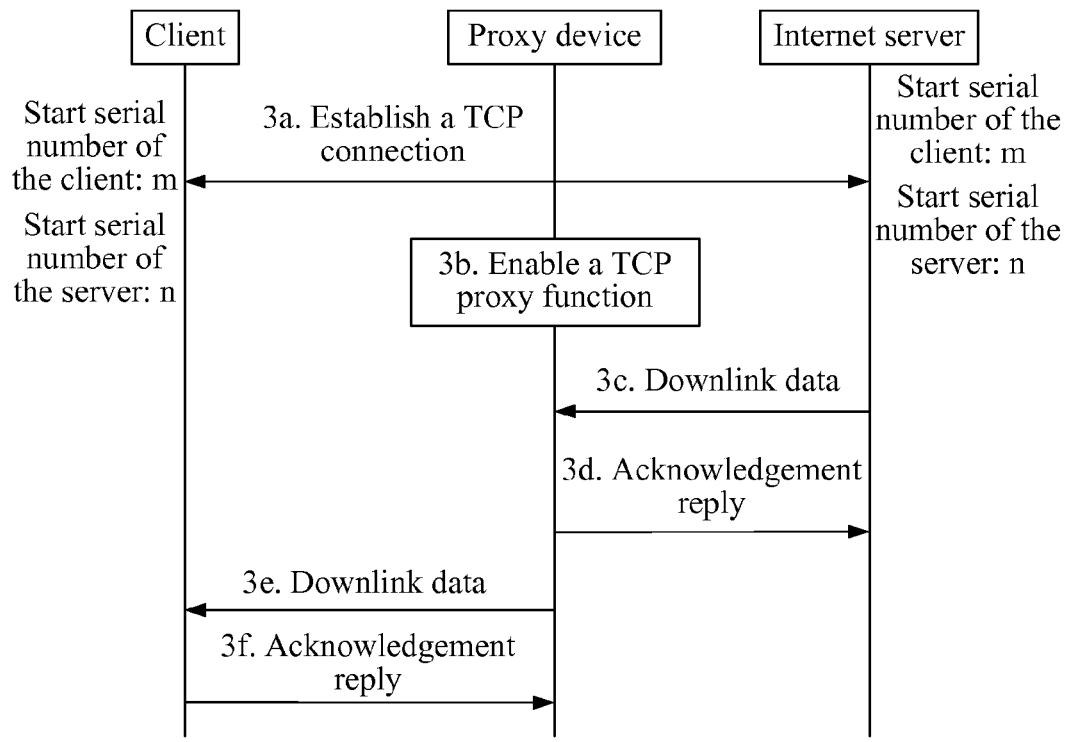
FIG. 3 is a flowchart of still another data transmission method according to an embodiment of the present invention.

FIG. 3 is a flowchart of still another data transmission method according to an embodiment of the present invention. As shown in FIG. 3, the method in this embodiment includes:

3a: A client establishes a TCP connection with an Internet server through a proxy device, and the proxy device records parameters in the TCP connection establishment process.

A three-way handshake process is required for establishment of the TCP connection.

Specifically, the client first sends a synchronization (SYN) request to the Internet server, randomly generates an initial serial number m, and sets a reply serial number to 0 for the first time, where the synchronization request occupies 1 byte. The Internet server sends a synchronization acknowledgement (SYN ACK) reply after receiving the synchronization request sent by the client, where the synchronization acknowledgement reply also occupies 1 byte. The Internet server randomly generates an initial serial number n, and because the synchronization request has occupied 1 byte, the Internet sever sets a reply serial number in the synchronization acknowledgement reply of the Internet server to m+1, which represents that, the Internet server has successfully received data of which a serial number is m, and expects to receive a next byte. The client sends a reply to the Internet server to notify the internet server that establishment of the TCP connection is complete, where the reply carries data of zero byte. The client has sent data of 1 byte to the Internet server; therefore, a start sequence number in the reply is m+1, in addition, the Internet server has also sent data of 1 byte to the client, a reply serial number in the reply is n+1, that is, the Internet server is notified that data of which a serial number is n is received, and the client expects to receive following data.

In this embodiment, the entity, namely, the proxy device, is used in the foregoing three-way handshake process. The proxy device records the parameters in the TCP connection establishment process, for example, a source IP address (that is, an IP address of the client) and a destination IP address (that is, an IP address of the Internet server) of the TCP connection, a first direction start serial number m, a first direction reply serial number 0, a second direction start serial number n, and a second direction reply serial number m+1, and updates the first direction start serial number m to m+1 and updates the first direction reply serial number 0 to n+1 after the client gives a reply to a reply message indicating that the Internet server completes establishment of the TCP connection.

In the foregoing three-way handshake process, the proxy device only functions as a repeater.

3b: The proxy device enables a TCP proxy function after the TCP connection is established between the client and the Internet server.

In this embodiment, the TCP proxy function includes two parts: one part is maintaining, as a proxy for the Internet server, the TCP connection with the client, that is, as a proxy for the Internet server, sending data to the client or receiving data from the client, and in the sending or receiving process, maintaining the IP address and a TCP port number of the Internet server, and a start serial number and a reply serial number of the data sent or received by the Internet server; and the other part is maintaining, as a proxy for the client, the TCP connection with the Internet server, that is, as a proxy for the client, sending data to the Internet server or receiving data from the Internet server, and in the sending or receiving process, maintaining the IP address and a TCP port number of the client, and a start serial number and a reply serial number of the data sent or received by the client. The TCP proxy function of the proxy device is transparent to the client and the Internet server.

The TCP proxy function in this embodiment is enabled after the TCP connection is established between the client and the Internet server, and an independent TCP connection is not established between the client and the proxy device, or between the Internet server and the proxy device; therefore, in order to differentiate from a proxy technology in the prior art, the proxy technology in the prior art may be called a prior TCP proxy technology, and a proxy technology in this embodiment is called a post TCP proxy technology.

3c: The Internet server sends, to the proxy device, downlink data sent to the client.

For example, the Internet server sends downlink data of k bytes to the client.

3d: The proxy device caches the downlink data sent by the Internet server, and acts as an agent of the client to give an acknowledgement reply to the received downlink data according to the recorded parameters.

The proxy device receives the downlink data of k bytes from the Internet server, caches the downlink data of k bytes, and sends the acknowledgement reply to the Internet server, where the acknowledgement reply occupies zero byte. The proxy device receives the downlink data of k bytes. An initial serial number of the downlink data is n+1, and a reply serial number of the downlink data is m+1, so that the proxy device sets an initial serial number in the acknowledgement reply sent to the Internet server to m+1, sets a reply serial number in the acknowledgement reply to n+k+1, acts as an agent of the client to notify the Internet server that the data of k bytes has been successfully received, and expects to receive subsequent downlink data; and at the same time, the proxy device maintains the second direction start serial number being n, and updates the second direction reply serial number m+1 to n+k+1.

Optionally, the proxy device may give an acknowledgement reply each time the proxy device receives one piece of downlink data, or may also give an acknowledgement reply after receiving multiple pieces of downlink data.

The rate of a wireless air interface between the proxy device and the client may be less than the rate of a fixed-line network between the proxy device and the Internet server; therefore, network congestion may occur. However, the proxy device in this embodiment caches the downlink data sent by the Internet server to the client, which facilitates solving the network congestion problem.

3e: The proxy device delivers the cached downlink data to the client according to the recorded parameters.

In the process in which the proxy device delivers the cached downlink data to the client, the proxy device may further update the recorded second direction start serial number n, and update the second direction start serial number n to an end serial number, of the sent downlink data, plus 1.

3f: The proxy device receives an acknowledgement reply from the client.

In the communication processes described in step 3d and step 3e, the proxy device always caches a part of the downlink data sent by the Internet server to the client, and at the same time, the proxy device has acted as an agent of the client to send acknowledgement replies of this part of downlink data to the Internet server; in this way, the start serial number of the downlink data that the Internet server continues to send does not correspond to the reply serial number in the acknowledgement reply given by the client for the downlink data sent by the proxy device, that is, out-of-synchronization of serial numbers occurs. The serial number synchronization refers to that a start serial number of the downlink data sent by the Internet server to send the downlink data is consistent with a reply serial number used by the client to give a reply to the Internet server, and a start serial number used by the client to send uplink data to the Internet server is consistent with a reply serial number used by the Internet server to give a reply to the client. However, the start serial number of the downlink data that the Internet server continues to deliver corresponds to the reply serial number in the acknowledgement reply sent by the proxy device as an agent of the client to the Internet server for the downlink data, that is, the serial number synchronization is maintained; and the start serial number of the downlink data sent by the proxy device to the client corresponds to the reply serial number in the acknowledgement reply given by the client for the downlink data sent by the proxy device, that is, the serial number synchronization is maintained.

After the proxy device delivers all the cached downlink data to the client, the quantity of the downlink data sent by the Internet server is the same as that of the downlink data received by the client; in this case, correspondence is restored for the reply serial number in the acknowledgement reply given by the client for the received downlink data and the start serial number of the downlink data that the Internet server continues to send, that is, the serial number synchronization is restored between the client and the Internet server.

It is mentioned in the foregoing embodiment that the rate of the wireless air interface between the proxy device and the client may be less than the rate of the fixed-line network between the proxy device and the Internet server, besides that, in some deployment situations or in some special situations, a scenario where the rate of the wireless air interface between the proxy device and the client may be greater than the rate of the fixed-line network between the proxy device and the Internet server may occur, for example, congestion may occur in the fixed-line network. In this scenario, the proxy device also needs to cache the uplink data sent by the client to the Internet server. The proxy device may cache a part of the downlink data sent by the Internet server to the client, which may cause temporary out-of-synchronization between a reply serial number used by the client to send the uplink data and the start serial number of the downlink data sent by the Internet server. That is to say, the reply serial number carried in the uplink data sent by the client can only reflect the downlink data received by the client but cannot reflect the downlink data cached by the proxy device; based on this, when forwarding, to the Internet server, the uplink data sent by the client, the proxy device needs to change the reply serial number carried in the uplink data, and specifically changes it to a reply serial number used when the proxy device gives an acknowledgement reply to a last piece of downlink data sent by the Internet server. The process in which the proxy device forwards the uplink data is described through specific embodiments in the following.

Figure 4:
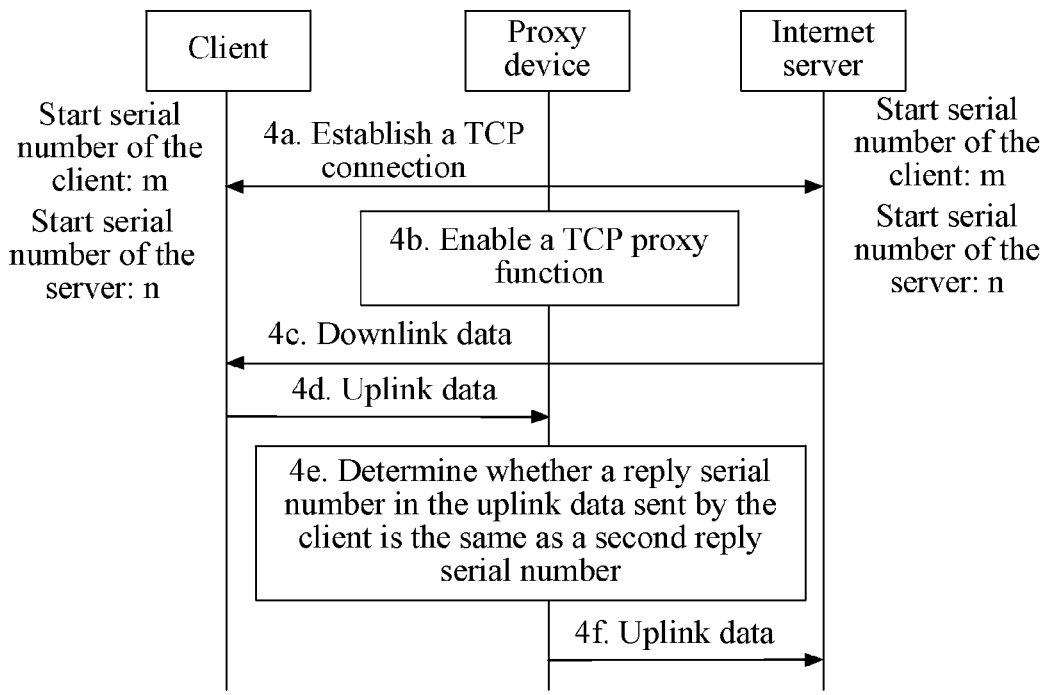
FIG. 4 is a flowchart of yet another data transmission method according to an embodiment of the present invention.

FIG. 4 is a flowchart of yet another data transmission method according to an embodiment of the present invention. As shown in FIG. 4, the method in this embodiment includes:

4a: A client establishes a TCP connection with an Internet server through a proxy device, and the proxy device records parameters in the TCP connection establishment process.

4b: The proxy device enables a TCP proxy function after the TCP connection is established between the client and the Internet server.

For the foregoing step 4a and step 4b, reference may be made to step 3a and step 3b, which are not repeated herein again.

4c: The Internet server sends downlink data to the client through the proxy device.

For the specific implementation of step 4c, reference may be made to the descriptions of step 3c to step 3f, which is not repeated herein again.

4d: The client sends, to the proxy device, uplink data sent to the Internet server.

4e: The proxy device determines whether a reply serial number in the uplink data sent by the client is the same as a second reply serial number, and if not, changes the reply serial number in the uplink data sent by the client to the second reply serial number. The second reply serial number refers to an end sequence number, of a last piece of downlink data sent by the Internet server, plus 1, and the end sequence number of the last piece of downlink data may be obtained by subtracting 1 from the sum of a start sequence number of the last piece of downlink data and the length of the last piece of downlink data.

There are multiple methods for the proxy device to determine whether the reply serial number in the uplink data sent by the client is the same as the second reply serial number. For example, one method is that, it is checked whether the proxy device locally caches the downlink data sent by the Internet server, and if the downlink data is cached, it may be determined that the reply serial number in the uplink data sent by the client is not the same as the second reply serial number. Another method is that, it is checked whether a reply serial number, which is recorded by the proxy device, in an acknowledgement reply given by the proxy device for the last piece of downlink data is consistent with the reply serial number in the uplink data sent by the client, and if the serial numbers are not consistent, it may be determined that the reply serial number in the uplink data sent by the client is not the same as the second reply serial number.

Optionally, if the proxy device does not locally cache the downlink data sent by the Internet server to the client, or the reply serial number in the acknowledgement reply given by the proxy device for the last piece of downlink data is consistent with the reply serial number in the uplink data sent by the client, the proxy device may perform no change, and directly forward, to the Internet server, the uplink data sent by the client.

4f: The proxy device sends, to the Internet server, the uplink data sent by the client or the uplink data of which the reply serial number is changed.

Figure 5:
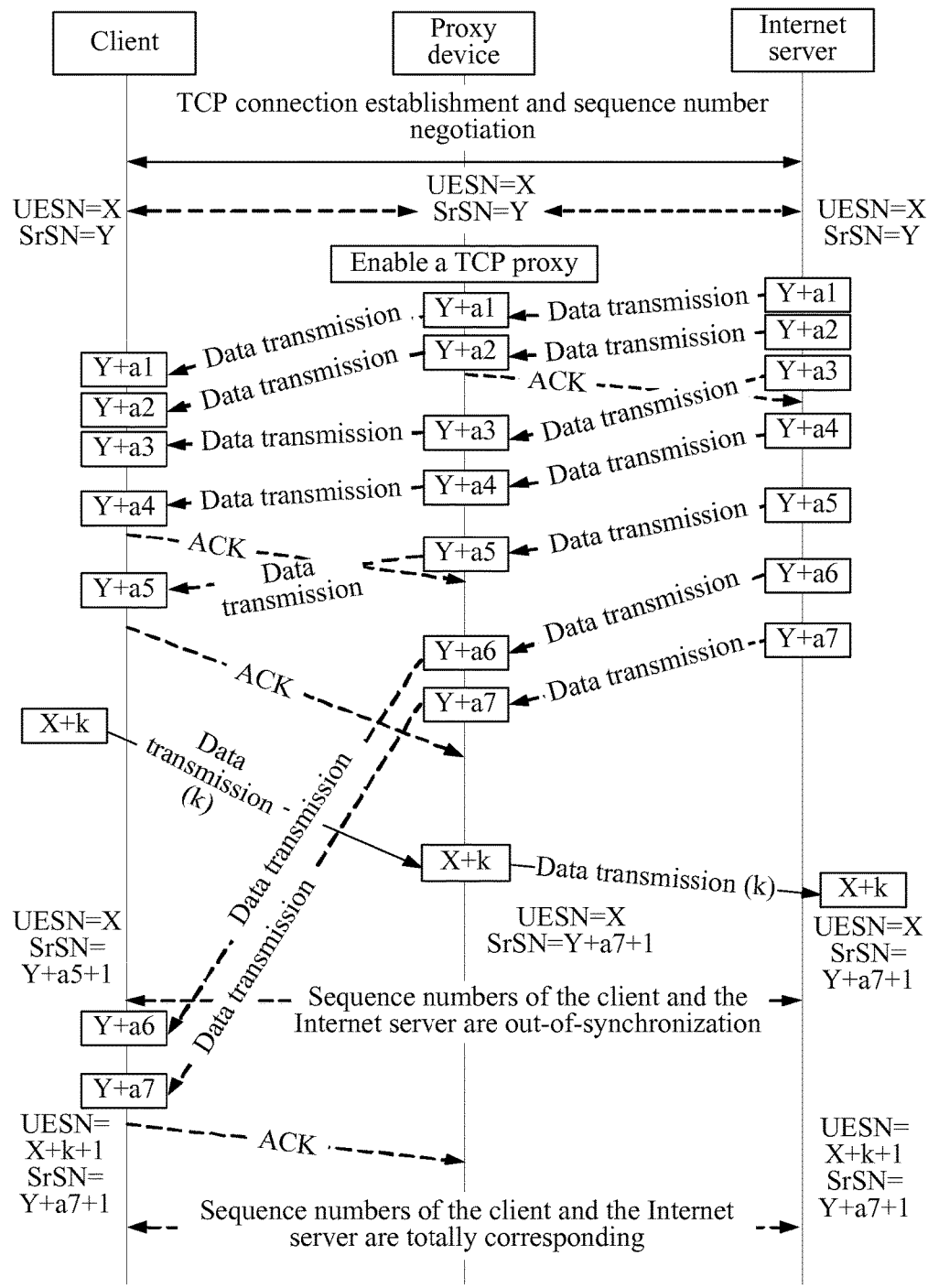
FIG. 5 is a flowchart of yet another data transmission method according to an embodiment of the present invention.

FIG. 5 is an example of the embodiment shown in FIG. 4 for description. In FIG. 5, UESN represents a start serial number of the uplink data sent by the client, and 1 is automatically added to the start serial number each time the client sends uplink data of 1 byte; and SrSN represents a start serial number of the downlink data sent by the Internet server to the client, and 1 is automatically added to the start serial number each time the Internet server sends downlink data of 1 byte. As shown in FIG. 5, a start serial number of a first piece of downlink data sent by the Internet server to client is Y, and an end serial number is Y+a1; a start serial number of a second piece of downlink data is Y+a1+1, and an end serial number is Y+a2; and by analogy, a start serial number of a last piece of downlink data is Y+a6+1, and an end serial number is Y+a7. The end serial number is obtained by subtracting 1 from the sum of the start serial number and the length of the downlink data.

As can be seen from FIG. 5, after receiving downlink data of which a start serial number is Y+a4+1 (that is, downlink data of which an end serial number is Y+a5), the client sends uplink data of which the length is k bytes to the proxy device. At this time, the client does not receive downlink data of which a start serial number is Y+a5+1 and downlink data of which a start serial number is Y+a6+1; therefore, the client regards that a start serial number from the Internet server side is Y+a5+1, and gives a reply to the downlink data with the start serial number Y+a4+1 when the Internet server sends the uplink data, that is, adds the reply serial number Y+a5+1 in the uplink data; and the Internet server has received acknowledgement replies of the proxy device for the start serial numbers Y+a5+1 and Y+a6+1; therefore, the start serial number regarded by the Internet server has been updated to Y+a7+1. As can be seen, the client regards that the start serial number from the Internet server side no longer corresponds to the start serial number regarded from the Internet server side; therefore, after receiving the uplink data sent by the client, the proxy device needs to change the reply serial number Y+a5+1 of the uplink data to Y+a7+1. Apparently, after the client successfully receives two pieces of downlink data of which the start serial numbers are Y+a5+1 and Y+a6+1, the reply serial number for the client to give a reply to the downlink data of the Internet server is maintained consistent with the start serial number regarded by the Internet server.

The client may be handed over from a source network to a target network because of the mobility of the client. In a scenario where a handover occurs, a network side device to which the client is attached in the source network is called a source network side device, and a network side device to which the client is attached in the target network is called a target network side device. From the TCP proxy function, that the client is handed over from the source network to the target network includes the following four cases: 1) the source network side device supports and has enabled the TCP proxy function, and the target network side device supports and has enabled the TCP proxy function; 2) the source network side device supports but has not enabled the TCP proxy function, and the target network side device supports and has enabled the TCP proxy function; 3) the source network side device supports and has enabled the TCP proxy function, and the target network side device does not support the TCP proxy function or supports but has not enabled the TCP proxy function; and 4) the source network side device and the target network side device do not support the TCP proxy function or support but have not enabled the TCP proxy function. In the foregoing four cases, only the first three cases are focused in the embodiments of the present invention, and a handover procedure based on the TCP proxy function is described in the following through specific embodiments.

Figure 6:
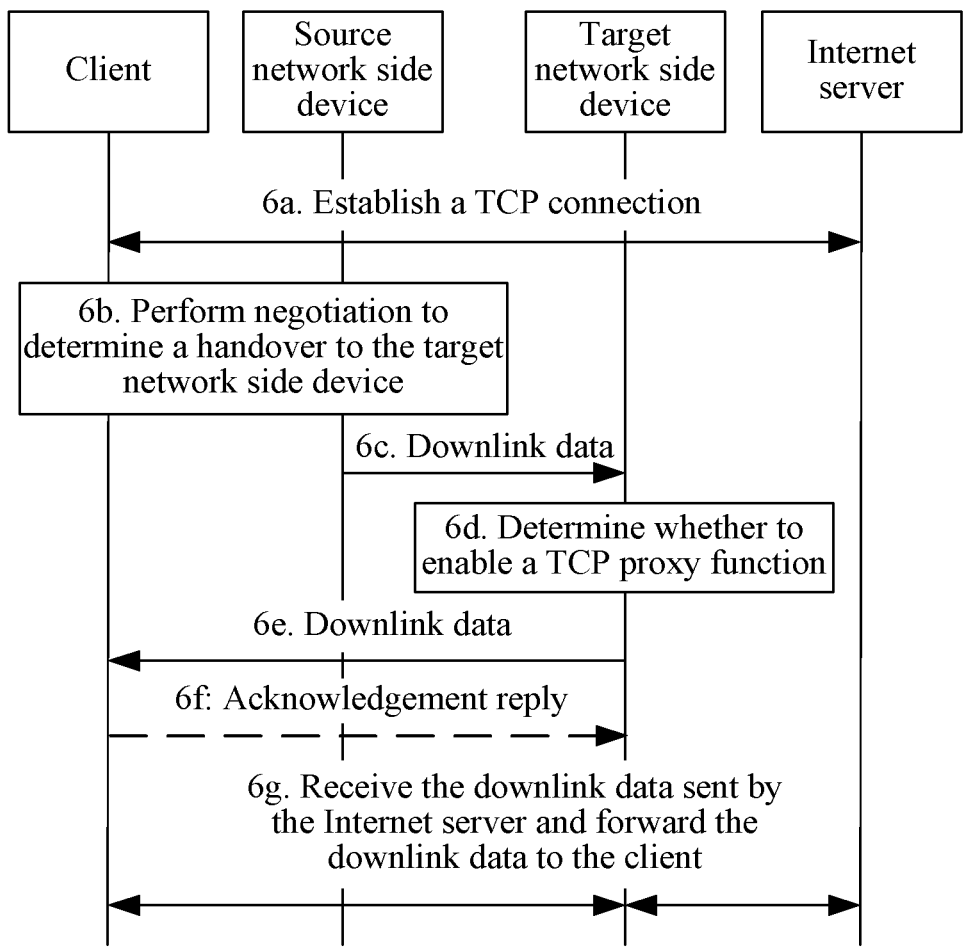
FIG. 6 is a flowchart of yet another data transmission method according to an embodiment of the present invention.

FIG. 6 is a flowchart of yet another data transmission method according to an embodiment of the present invention. As shown in FIG. 6, the method in this embodiment includes:

6a: Establish an end-to-end TCP connection between a client and an Internet server, and perform data transmission through the TCP connection; and in this embodiment, that the Internet server sends downlink data to the client is used as an example for description.

Specifically, a source network side device may support and have enabled a TCP proxy function, or may not support a TCP proxy function or support but has not enabled the TCP proxy function. If the source network side device supports and has enabled the TCP proxy function, the source network side device may be responsible for forwarding data between the Internet server and the client according to a related procedure in the embodiments shown in FIG. 1 to FIG. 3, and details are not repeated. If the source network side device does not support or supports but has not enabled the TCP proxy function, the source network side device may be responsible for data transmission between the Internet server and the client as in the prior art. In any of these cases, the source network side device can cache the data between the client and the Internet server.

Here, it should be noted that, whether the source network side device has enabled the TCP proxy function is transparent to the client and the Internet server.

6b: The client negotiates with the source network side device to determine to be handed over to a target network side device.

6c: The source network side device provides, for the target network side device, the downlink data sent by the Internet server to the client and cached.

In this step, the source network side device may not support the TCP proxy function, or support but has not enabled the TCP proxy function; in this case, the source network side device may only forward the cached downlink data to the target network side device.

Alternatively, the source network side device may also support and have enabled the TCP proxy function, so that the source network side device may only forward the cached downlink data to the target network side device, or forward the cached downlink data to the target network side device, and send a proxy enabling instruction to the target network side device, so as to instruct the target network side device to enable the TCP proxy function. Optionally, the source network side device may send the cached downlink data and the proxy enabling instruction to the target network side device respectively through an independent step, or the source network side device may also send the cached downlink data and the proxy enabling instruction to the target network side device through a same step.

6d: The target network side device determines whether to enable the TCP proxy function.

The downlink data provided by the source network side device carries information such as a source IP address, a destination IP address, a source port number, a destination port number, a start serial number, and a reply serial number; therefore, the target network side device may obtain, according to the downlink data forwarded by the source network side device, parameters such as an IP address and a port number of the client, an IP address and a port number of the Internet server, a start serial number of data sent by the client, and a start sequence number of data sent by the Internet server.

Optionally, if the source network side device sends the proxy enabling instruction to the target network side device, the target network side device may determine, according to the proxy enabling instruction delivered by the source network side device, to enable the TCP proxy function. Alternatively, the target network side device may determine, according to a parameter such as a QCI corresponding to the TCP connection between the client and the Internet server, to enable the TCP proxy function. The target network side device may know the parameter such as the QCI corresponding to the TCP connection between the client and the Internet server. Alternatively, it may be pre-specified that the target network side device unconditionally enables the TCP proxy function for a client handed over to a network where the target network side device is located, so that the target network side device may directly determine to enable the TCP proxy function.

6e: The target network side device forwards, to the client, the downlink data sent by the Internet server to the client.

Specifically, if the target network side device determines to enable the TCP proxy function, the target network side device may forward, to the client according to the parameters such as the IP address and the port number of the client, the IP address and the port number of the Internet server, the start serial number of the data sent by the client, and the start sequence number of the data sent by the Internet server, which are obtained from the downlink data forwarded by the source network side device, and according to a related procedure in the embodiment shown in FIG. 2A to FIG. 4, the downlink data sent by the Internet server to the client. If the target network side device has not enabled the TCP proxy function, the target network side device may forward, to the client through the TCP connection between the client and the Internet server, the downlink data sent by the Internet server to the client, and in this process, the target network side device only functions as a repeater.

6f: The client sends an acknowledgement reply to the target network side device.

The source network side device may have enabled the TCP proxy function and have acted as an agent of the client to send the acknowledgement reply to the Internet server for the downlink data forwarded to the target network side device; in this case, the target network side device does not need to re-send the acknowledgement reply to the Internet server.

6g: The target network side device continues to receive the downlink data sent by the Internet server, and forwards the received downlink data to the client.

In this step, if the target network side device has enabled the TCP proxy function, the target network side device may forward, to the client according to the procedure in the embodiments shown in FIG. 2A to FIG. 4, the downlink data sent by the Internet server, and act as agent of the client to send an acknowledgement to the Internet server.

Here, it should be noted that, if the source network side device supports and has enabled the TCP proxy function, the source network side device may provide a proxy implementation solution for the client; and if the target network side device supports and has enabled the TCP proxy function, the target network side device may be implemented as the proxy device in the target network where the client in the foregoing embodiment is located.

According to the data transmission method provided by the embodiment of the present invention, a TCP connection is established between a client and an Internet server, where the proxy device interacts with the client in a wireless manner, and the proxy device interacts with the Internet server in a wired manner; therefore, the proxy device implements a TCP proxy function based on the TCP connection between the client and the Internet server, and an independent TCP connection does not need to be established between the proxy device and the client, or between the proxy device and the Internet server; therefore, when the client has a network handover due to mobility, the TCP connection between the client and the Internet server is not interrupted, and the TCP connection does not need to be reestablished, thereby solving the problem in the prior art that the TCP connection between the client and the proxy device and the TCP connection between the Internet server and the proxy device need to be reestablished after being interrupted, which is caused by the mobility of the client, and providing a technology where data transmission is performed still through the proxy device and which is different from that in the prior art.

Figure 7:
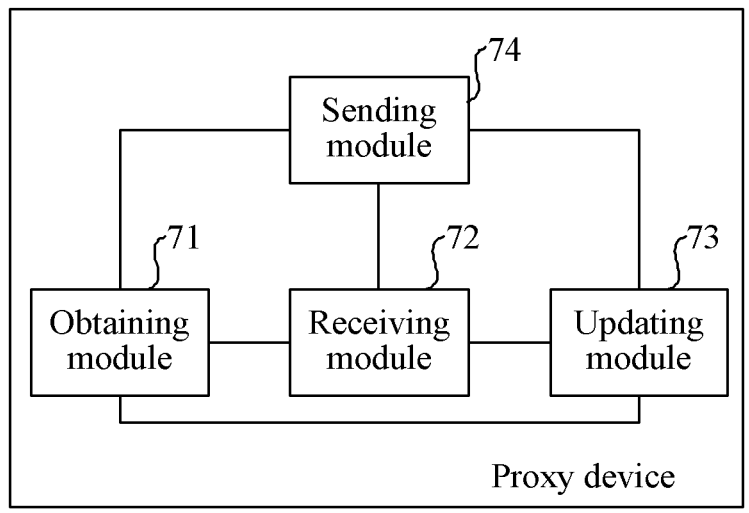
FIG. 7 is a schematic structural diagram of a proxy device according to an embodiment of the present invention.

FIG. 7 is a schematic structural diagram of a proxy device according to an embodiment of the present invention. As shown in FIG. 7, the proxy device includes: an obtaining module 71, a receiving module 72, an updating module 73, and a sending module 74.

The obtaining module 71 is configured to obtain a first direction start serial number and a first direction reply serial number that correspond to a first direction and a second direction start serial number corresponding to a second direction, where a Transmission Control Protocol TCP connection is established between a first device and a second device, the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction.

The receiving module 72 is connected to the obtaining module 71, and is configured to: after the obtaining module 71 obtains the first direction start serial number, the first direction reply serial number, and the second direction start serial number, receive first data sent in the first direction by the first device to the second device. The first data may be uplink data sent by the client to the Internet server, or may be downlink data sent by the Internet server to the client.

The updating module 73 is connected to the obtaining module 71 and the receiving module 72, and is configured to update the first direction reply serial number obtained by the obtaining module 71 to an end sequence number of the first data received by the receiving module 72 plus 1.

The sending module 74 is connected to the obtaining module 71 and the updating module 73, and is configured to send a first acknowledgement reply to the first device according to the first direction reply serial number updated by the updating module 73 and the second direction start serial number obtained by the obtaining module 71.

The sending module 74 is further connected to the receiving module 72, and is further configured to forward the first data received by the receiving module 72 to the second device.

The updating module 73 is further configured to update the first direction start serial number obtained by the obtaining module 71 to the first direction reply serial number. Here, the first direction reply serial number is the first direction reply serial number obtained by the obtaining module 71 rather than the updated first direction reply serial number.

In an optional implementation manner, the obtaining module 71 is further configured to obtain a second direction reply serial number corresponding to the second direction, where the second direction reply serial number is an end sequence number, which corresponds to end data in the second direction, plus 1, and the end data in the second direction is a last piece of data cached in the proxy device last time and in the second direction.

Based on this, the receiving module 72 is further configured to: after the obtaining module 71 obtains the second direction reply serial number, receive second data sent in the second direction by the second device to the first device. The updating module 73 is further configured to update the second direction reply serial number obtained by the obtaining module 71 to an end sequence number of the second data received by the receiving module 72, plus 1. The sending module 74 is further configured to send a second acknowledgement reply to the second device according to the second direction reply serial number updated by the updating module 73 and the first direction start serial number obtained by the obtaining module 71. The sending module 74 is further configured to forward the second data received by the receiving module 72 to the first device. The updating module 73 is further configured to update the second direction start serial number obtained by the obtaining module 71 to the second direction reply serial number. Here, the second direction reply serial number is the second direction reply serial number obtained by the obtaining module 71 rather than the updated second direction reply serial number.

Figure 8:
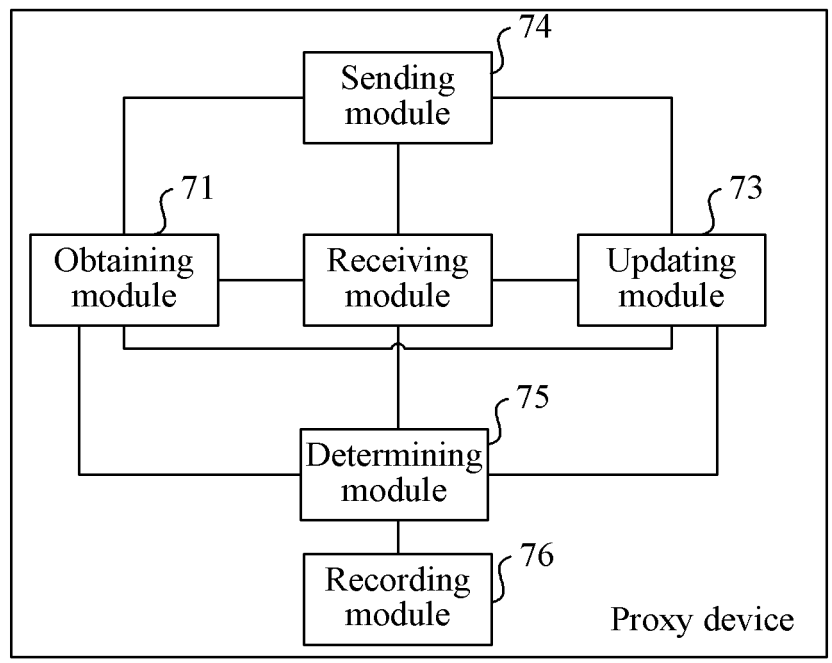
FIG. 8 is a schematic structural diagram of another proxy device according to an embodiment of the present invention.

Further, as shown in FIG. 8, the proxy device further includes: a determining module 75. The determining module 75 is configured to determine whether a reply serial number in the second data is the same as the second direction reply serial number. The updating module 73 is specifically configured to update the second direction reply serial number to the end sequence number of the second data plus 1 when the determining module 75 determines that the reply serial number in the second data is not the same as the second direction reply serial number. The determining module 75 is connected to the receiving module 72, the obtaining module 71, and the updating module 73.

Optionally, the determining module 75 may be specifically configured to determine whether the first data is locally cached, and if a determining result is yes, determine that the reply serial number in the second data is not the same as the second direction reply serial number.

Further, as shown in FIG. 8, the proxy device further includes: a recording module 76. The recording module 76 is configured to record a reply serial number in the first acknowledgement reply. Based on this, the determining module 75 may be specifically configured to: if it is determined that the reply serial number, in the first acknowledgement reply, recorded by the recording module 76 is not the same as the reply serial number in the second data received by the receiving module 72, determine that the reply serial number in the second data is not the same as the second direction reply serial number. The determining module 75 is further connected to the recording module 76.

In an optional implementation manner, the obtaining module 71 may be specifically configured to record parameters in the TCP connection establishment process, and obtain the first direction start serial number, the first direction reply serial number, the second direction start serial number, and the second direction reply serial number from the recorded parameters, where the TCP connection establishment process refers to a process in which the client establishes the TCP connection with the Internet server through the proxy device. In this implementation manner, the client establishes the TCP connection with the Internet server through the proxy device.

In an optional implementation manner, the obtaining module 71 may be specifically configured to obtain the first direction start serial number, the first direction reply serial number, the second direction start serial number, and the second direction reply serial number from downlink data that is received by the receiving module 72 when the client is handed over from a source network side device to the proxy device, where the downlink data is downlink data sent by the Internet server to the client, forwarded through the source network side device, and cached in the source network side device, and the source network side device is a network side device to which the client is attached before the handover, and the proxy device is a network side device to which the client is attached after the handover. Accordingly, the receiving module 72 is further configured to: when the client is handed over from the source network side device to the proxy device, receive the downlink data sent by the Internet server to the client, cached in the source network side device, and forwarded by the source network side device, and provide the downlink data for the obtaining module 71.

In an optional implementation manner, the sending module 74 is further configured to: when the client is handed over from the proxy device to a target network side device, send, to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover.

Function modules of the proxy device provided by this embodiment may be configured to perform the procedures in the method embodiments shown in FIG. 2A to FIG. 6, a specific working principle thereof is not repeated again, and for details, refer to the descriptions in the method embodiments.

The proxy device provided by this embodiment interacts with a client in a wireless manner, and interacts with an Internet server in a wired manner; a TCP connection is established between the client and the Internet server; and the proxy device in this embodiment obtains a start serial number and a reply serial number of data sent by the client to the Internet server and a start serial number of data sent by the Internet server to the client, or obtains a start serial number and a reply serial number of data sent by the Internet server to the client and a start serial number of data sent by the client to the Internet server, and according to the obtained corresponding start serial number and reply serial number, forwards, to the client, the data sent by the Internet server to the client or forwards, to the Internet server, the data sent by the client to the Internet server, and updates the corresponding start serial number and reply serial number, so as to implement data forwarding between the Internet server and the client. Because the proxy device in this embodiment does not actually establish a TCP connection separately with the client or the Internet server, data transmission is performed based on the TCP connection between the client and the Internet server, and interruption and reestablishment of the TCP connection that are caused by the mobility of the client are not involved in the data transmission process, and therefore, the data transmission is not interrupted and the quality of service of a wireless network is not affected.

Figure 9:
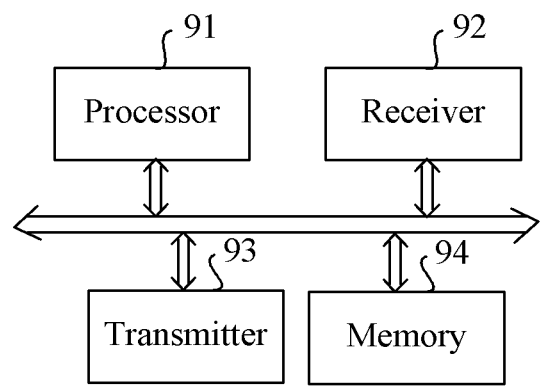
FIG. 9 is a schematic structural diagram of still another proxy device according to an embodiment of the present invention.

FIG. 9 is a schematic structural diagram of still another proxy device according to an embodiment of the present invention. As shown in FIG. 9, the proxy device includes: a processor 91, a receiver 92, and a transmitter 93.

The processor 91 is configured to obtain a first direction start serial number and a first direction reply serial number that correspond to a first direction and a second direction start serial number corresponding to a second direction, where a Transmission Control Protocol TCP connection is established between a first device and a second device, the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction.

The receiver 92 is configured to receive first data sent in the first direction by the first device to the second device.

The processor 91 is further configured to update the first direction reply serial number to an end sequence number of the first data received by the receiver plus 1.

The transmitter 93 is configured to send a first acknowledgement reply to the first device according to the first direction reply serial number updated by the processor 91 and the second direction start serial number obtained by the processor 91.

The transmitter 93 is configured to forward the first data received by the receiver 92 to the second device.

The processor 91 is further configured to update the first direction start serial number to the first direction reply serial number. Here, the first direction reply serial number is the first direction reply serial number obtained by the processor 91 rather than the updated first direction reply serial number.

Optionally, the processor 91 is further configured to obtain a second direction reply serial number corresponding to the second direction, where the second direction reply serial number is an end sequence number, which corresponds to end data in the second direction, plus 1, and the end data in the second direction is a last piece of data cached in the proxy device last time and in the second direction. Based on this, the receiver 92 is further configured to: after the processor 91 obtains the second direction reply serial number, receive second data sent in the second direction by the second device to the first device. The processor 91 is further configured to update the second direction reply serial number to an end sequence number of the second data plus 1. The transmitter 93 is further configured to send a second acknowledgement reply to the second device according to the second direction reply serial number and the first direction start serial number that are updated by the processor 91. The transmitter 93 is further configured to forward the second data received by the receiver 92 to the first device. The processor 91 is further configured to update the second direction start serial number to the second direction reply serial number. Here, the second direction reply serial number is the second direction reply serial number obtained by the processor 91 rather than the updated second direction reply serial number.

Optionally, the processor 91 is further configured to determine whether a reply serial number in the second data is the same as the second direction reply serial number. The processor 91 is specifically configured to update the second direction reply serial number to the end sequence number of the second data plus 1 when it is determined that the reply serial number in the second data is not the same as the second direction reply serial number.

Optionally, the processor 91 may be specifically configured to determine whether the first data is locally cached, if a determining result is yes, determine that the reply serial number in the second data is not the same as the second direction reply serial number, and then, update the second direction reply serial number to the end sequence number of the second data plus 1. Alternatively, The processor 92 is further configured to record a reply serial number in the first acknowledgement reply after the transmitter 93 sends the first acknowledgement reply. Based on this, the processor 92 may be specifically configured to: if it is determined that the recorded reply serial number in the first acknowledgement reply is not the same as the reply serial number in the second data, determine that the reply serial number in the second data is not the same as the second direction reply serial number.

In an optional implementation manner, that the processor 91 is specifically configured to record parameters in the TCP connection establishment process, and obtain the first direction start serial number, the first direction reply serial number, the second direction start serial number, and the second direction reply serial number from the recorded parameters, where the TCP connection establishment process refers to a process in which the client establishes the TCP connection with the Internet server through the proxy device. In this implementation manner, the client establishes the TCP connection with the Internet server through the proxy device.

In an optional implementation manner, that the processor 91 is configured to obtain a first direction start serial number, a first direction reply serial number, a second direction start serial number, and a second direction reply serial number includes that the processor 91 is specifically configured to obtain the first direction start serial number, the first direction reply serial number, the second direction start serial number, and the second direction reply serial number from downlink data that is received by the receiver 92 when the client is handed over from a source network side device to the proxy device, where the downlink data is downlink data sent by the Internet server to the client, cached in the source network side device, and forwarded by the source network side device, the source network side device is a network side device to which the client is attached before the handover, and the proxy device is a network side device to which the client is attached after the handover. The receiver 92 is further configured to: when the client is handed over from the source network side device to the proxy device, receive the downlink data sent by the Internet server to the client, cached in the source network side device, and forwarded by the source network side device, and provide the downlink data for the processor 91.

Further, the sender 92 is further configured to: when the client is handed over from the proxy device to a target network side device, send, to the target network side device, downlink data sent by the Internet server to the client and still cached in the proxy device, so that the target network side device continues to forward the received downlink data to the client, where the proxy device is a network side device to which the client is attached before the handover, and the target network side device is a network side device to which the client is attached after the handover.

Further, as shown in FIG. 9, the proxy device further includes: a memory 94. The memory 94 is configured to store a program. Specifically, the program may include program code, where the program code includes a computer operation instruction. The memory 94 may include a high-speed RAM, and may further include a non-volatile memory (non-volatile memory), for example, at least one disk memory.

Optionally, in a specific implementation, if the processor 91, the receiver 92, the transmitter 93, and the memory 94 are implemented independently, the processor 91, the receiver 92, the transmitter 93, and the memory 94 may be interconnected and complete mutual communication through a bus. The bus may be an industry standard architecture (Industry Standard Architecture, ISA for short) bus, a peripheral component interconnect (Peripheral Component, PCI for short) bus, an Extended Industry Standard Architecture (Extended Industry Standard Architecture, EISA for short) bus, or the like. The bus may be classified into an address bus, a data bus, a control bus, or the like. For the convenience of representation, it is represented by a bold line in FIG. 9, which does not represent that only one bus or one type of buses exists.

Optionally, in a specific implementation, if the processor 91, the receiver 92, the transmitter 93, and the memory 94 are implemented by being integrated into one chip, the processor 91, the receiver 92, the transmitter 93, and the memory 94 may complete mutual communication through an internal interface.

The proxy device provided by this embodiment may be configured to perform the procedures in the method embodiments shown in FIG. 2A to FIG. 6, a specific working principle thereof is not repeated again, and for details, refer to the descriptions in the method embodiments.

The proxy device provided by this embodiment interacts with a client in a wireless manner, and interacts with an Internet server in a wired manner; a TCP connection is established between the client and the Internet server; and the proxy device in this embodiment obtains a start serial number and a reply serial number in a direction in which the client sends data to the Internet server and a start serial number in a direction in which the Internet server sends data to the client, or obtains a start serial number and a reply serial number in a direction in which the Internet server sends data to the client and a start serial number in a direction in which the client sends data to the Internet server, and according to the obtained start serial number and reply serial number in the corresponding direction, forwards, to the client, the data sent by the Internet server to the client or forwards, to the Internet server, the data sent by the client to the Internet server, and updates the corresponding start serial number and reply serial number, so as to implement data forwarding between the Internet server and the client. Because the proxy device in this embodiment does not actually establish a TCP connection separately with the client or the Internet server, data transmission is performed based on the TCP connection between the client and the Internet server, and interruption and reestablishment of the TCP connection that are caused by the mobility of the client are not involved in the data transmission process, and therefore, the data transmission is not interrupted and the quality of service of a wireless network is not affected.

An embodiment of the present invention provides a data transmission system, which includes: a first device, a second device, and the proxy device shown in FIG. 7 or FIG. 8.

Further, the first device may be a client and the second device may be an Internet server, or the first device may be an Internet server, so that the second device may be a client. For a process in which the client, the server, and the proxy device coordinate with each other to perform data transmission, reference may be made to the descriptions in the foregoing method embodiments, which is not repeated herein again. The data transmission system provided by this embodiment will not affect the quality of service of a wireless network.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as these modifications or replacements do not cause corresponding technical solutions to depart from the spirit and scope of the technical solutions of the embodiments of the present invention.

What is claimed is:

1. A data transmission method, comprising:
    establishing a Transmission Control Protocol (TCP) connection between a first device and a second device, wherein the first device is a client and the second device is an Internet server, or the first device is an Internet server and the second device is a client; and
    a proxy device interacts with the client in a wireless manner, and the proxy device interacts with the Internet server in a wired manner;
    obtaining, by the proxy device, a first direction start serial number and a first direction reply serial number that correspond to a first direction, a second direction start serial number and a second direction reply serial number corresponding to a second direction, wherein the first direction is a direction in which the first device sends data to the second device, and the second direction is a direction in which the second device sends data to the first device;
    the first direction start serial number is a start sequence number corresponding to start data in the first direction, and the start data in the first direction is a first piece of data cached in the proxy device last time and transmitted in the first direction;
    the first direction reply serial number is an end sequence number, which corresponds to end data in the first direction, plus 1, and the end data in the first direction is a last piece of data cached in the proxy device last time and transmitted in the first direction; and
    the second direction start serial number is a start sequence number corresponding to start data in the second direction, and the start data in the second direction is a first piece of data cached in the proxy device last time and transmitted in the second direction;
    wherein the second direction reply serial number is an end sequence number, which corresponds to end data in the second direction, plus 1, and the end data in the second direction is a last piece of data cached in the proxy device last time and in the second direction;
    receiving, by the proxy device, first data sent in the first direction by the first device to the second device, and updating the first direction reply serial number to an end sequence number of the first data plus 1;
    sending, by the proxy device, a first acknowledgement reply to the first device according to the updated first direction reply serial number and the second direction start serial number; and forwarding, by the proxy device, the first data to the second device, and updating the first direction start serial number to the first direction reply serial number;

determining, by the proxy device whether the first direction reply serial number is the same as the second direction reply serial number, and if not, updating the first direction reply serial number to the second direction reply serial number.

2. The data transmission method according to claim 1, wherein the method further comprises:

receiving, by the proxy device, second data sent in the second direction by the second device to the first device, and updating the second direction reply serial number to an end sequence number of the second data plus 1;

sending, by the proxy device, a second acknowledgement reply to the second device according to the updated second direction reply serial number and first direction start serial number; and forwarding, by the proxy device, the second data to the first device, and updating the second direction start serial number to the second direction reply serial number.

3. The data transmission method according to claim 2, before the updating, by the proxy device, the second direction reply serial number to an end sequence number of the second data plus 1, further comprising:

determining, by the proxy device, that a reply serial number in the second data is not the same as the second direction reply serial number.

4. The data transmission method according to claim 3, wherein the determining, by the proxy device, that a reply serial number in the second data is not the same as the second direction reply serial number comprises:

determining, by the proxy device, whether the first data is locally cached, and if a determining result is yes, determining that the reply serial number in the second data is not the same as the second direction reply serial number.

5. The data transmission method according to claim 3, wherein the method further comprises:

recording, by the proxy device, a reply serial number in the first acknowledgement reply; and the determining, by the proxy device, that a reply serial number in the second data is not the same as the second direction reply serial number comprises:

if the proxy device determines that the reply serial number in the first acknowledgement reply is not the same as the reply serial number in the second data, determining, by the proxy device, that the reply serial number in the second data is not the same as the second direction reply serial number.

6. The data transmission method according to claim 2, wherein the obtaining, by the proxy device, a first direction start serial number and a first direction reply serial number that correspond to a first direction and a second direction start serial number and a second direction reply serial number that correspond to a second direction comprises:

when the client is handed over from a source network side device to the proxy device, receiving, by the proxy device, downlink data, and obtaining the first direction start serial number, the first direction reply serial number, the second direction start serial number, and the second direction reply serial number from the downlink data, wherein the downlink data is downlink data sent by the Internet server to the client, cached in the source network side device, and forwarded by the source network side device, the source network side device is a network side device to which the client is attached before the handover, and the proxy device is a network side device to which the client is attached after the handover.

7. The data transmission method according to claim 1, wherein the method further comprises:

when the client is handed over from the proxy device to a target network side device, sending, by the proxy device to the target network side device, downlink data sent by the Internet server to the client and still cached in the proxy device, the target network side device continues to forward the received downlink data to the client, wherein the proxy device is a network side device to which the client is attached before the handover, and the target network side device is a network side device to which the client is attached after the handover.

8. A proxy device, comprising:

a processor, configured to obtain a first direction start serial number and a first direction reply serial number that correspond to a first direction, a second direction start serial number and a second direction reply serial number corresponding to a second direction, wherein a Transmission Control Protocol (TCP) connection is established between a first device and a second device, wherein the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction;

wherein the second direction reply serial number is an end sequence number, which corresponds to end data in the second direction, plus 1, and the end data in the second direction is a last piece of data cached in the proxy device last time and in the second direction;

a receiver, configured to receive first data sent in the first direction by the first device to the second device, wherein the processor is further configured to update the first direction reply serial number to an end sequence number of the first data received by the receiver plus 1; and a transmitter, configured to send a first acknowledgement reply to the first device according to the first direction reply serial number updated by the processor and the second direction start serial number obtained by the processor, wherein the transmitter is further configured to forward the first data received by the receiver to the second device; and the processor is further configured to update the first direction start serial number to the first direction reply serial number, determine whether the first direction reply serial number is the same as the second direction reply serial number, and, if not, update the first direction reply serial number to the second direction reply serial number.

9. The proxy device according to claim 8, wherein the receiver is further configured to receive second data sent in the second direction by the second device to the first device;

the processor is further configured to update the obtained second direction reply serial number to an end sequence number of the second data received by the receiver plus 1;

the transmitter is further configured to send a second acknowledgement reply to the second device according to the second direction reply serial number and the first direction start serial number that are updated by the processor;

the transmitter is further configured to forward the second data received by the receiver to the first device; and the processor is further configured to update the second direction start serial number to the second direction reply serial number.

10. The proxy device according to claim 9, wherein the processor is further configured to determine whether a reply serial number in the second data is the same as the second direction reply serial number.

11. The proxy device according to claim 10, wherein the processor is configured to determine whether the first data is locally cached, and if a determining result is yes, determine that the reply serial number in the second data is not the same as the second direction reply serial number.

12. The proxy device according to claim 9, wherein the processor is further configured to record a reply serial number in the first acknowledgement reply; and the processor is configured to:

if it is determined that the recorded reply serial number in the first acknowledgement reply is not the same as the reply serial number in the second data, determine that the reply serial number in the second data is not the same as the second direction reply serial number.

13. The proxy device according to claim 9, wherein the processor is configured to obtain the first direction start serial number, the first direction reply serial number, the second direction start serial number, and the second direction reply serial number from downlink data that is received by the receiver when the client is handed over from a source network side device to the proxy device, wherein the downlink data comprises downlink data sent by the Internet server to the client, cached in the source network side device, and forwarded by the source network side device, the source network side device is a network side device to which the client is attached before the handover, and the proxy device is a network side device to which the client is attached after the handover.

14. The proxy device according to claim 8, wherein the sender is further configured to: when the client is handed over from the proxy device to a target network side device, send, to the target network side device, downlink data sent by the Internet server to the client and still cached in the proxy device, the target network side device continues to forward the received downlink data to the client, wherein the proxy device is a network side device to which the client is attached before the handover, and the target network side device is a network side device to which the client is attached after the handover.

15. A chip, comprising:

a proxy device, comprising:

a processor, configured to obtain a first direction start serial number and a first direction reply serial number that correspond to a first direction, and a second direction start serial number and a second direction reply serial number corresponding to a second direction, wherein a Transmission Control Protocol (TCP) connection is established between a first device and a second device, wherein the first device is a client and the second device is an Internet server, or the first device is an Internet server and the second device is a client; the proxy device interacts with the client in a wireless manner, and the proxy device interacts with the Internet server in a wired manner;

the first direction is a direction in which the first device sends data to the second device, and the second direction is a direction in which the second device sends data to the first device;

the first direction start serial number is a start sequence number corresponding to start data in the first direction, and the start data in the first direction is a first piece of data cached in the proxy device last time and transmitted in the first direction;

the first direction reply serial number is an end sequence number, which corresponds to end data in the first direction, plus 1, and the end data in the first direction is a last piece of data cached in the proxy device last time and transmitted in the first direction; and the second direction start serial number is a start sequence number corresponding to start data in the second direction, and the start data in the second direction is a first piece of data cached in the proxy device last time and transmitted in the second direction;

wherein the second direction reply serial number is an end sequence number, which corresponds to end data in the second direction, plus 1, and the end data in the second direction is a last piece of data cached in the proxy device last time and in the second direction;

a receiver, configured to receive first data sent in the first direction by the first device to the second device, wherein the processor is further configured to update the first direction reply serial number to an end sequence number of the first data received by the receiver plus 1; and a transmitter, configured to send a first acknowledgement reply to the first device according to the first direction reply serial number updated by the processor and the second direction start serial number obtained by the processor, wherein the transmitter is further configured to forward the first data received by the receiver to the second device; and the processor is further configured to update the first direction start serial number to the first direction reply serial number, determine whether the first direction reply serial number is the same as the second direction reply serial number, and, if not, update the first direction reply serial number to the second direction reply serial number.

16. The chip according to claim 15, wherein
the receiver is further configured to receive second data sent in the second direction by the second device to the first device;
the processor is further configured to update the obtained second direction reply serial number to an end sequence number of the second data received by the receiver plus 1;
the transmitter is further configured to send a second acknowledgement reply to the second device according to the second direction reply serial number and the first direction start serial number that are updated by the processor;
the transmitter is further configured to forward the second data received by the receiver to the first device; and
the processor is further configured to update the second direction start serial number to the second direction reply serial number.

17. The chip according to claim 16, wherein the processor is further configured to determine whether a reply serial number in the second data is the same as the second direction reply serial number.

18. The chip according to claim 17, wherein the processor is configured to determine whether the first data is locally cached, and if a determining result is yes, determine that the reply serial number in the second data is not the same as the second direction reply serial number.

19. The chip according to claim 16, wherein
the processor is further configured to record a reply serial number in the first acknowledgement reply; and
the processor is configured to:
if it is determined that the recorded reply serial number in the first acknowledgement reply is not the same as the reply serial number in the second data, determine that the reply serial number in the second data is not the same as the second direction reply serial number.

20. The chip according to claim 16, wherein the processor is configured to obtain the first direction start serial number, the first direction reply serial number, the second direction start serial number, and the second direction reply serial number from downlink data that is received by the receiver when the client is handed over from a source network side device to the proxy device, wherein the downlink data comprises downlink data sent by the Internet server to the client, cached in the source network side device, and forwarded by the source network side device, the source network side device is a network side device to which the client is attached before the handover, and the proxy device is a network side device to which the client is attached after the handover.

21. The chip according to claim 15, wherein the sender is further configured to: when the client is handed over from the proxy device to a target network side device, send, to the target network side device, downlink data sent by the Internet server to the client and still cached in the proxy device, the target network side device continues to forward the received downlink data to the client, wherein the proxy device is a network side device to which the client is attached before the handover, and the target network side device is a network side device to which the client is attached after the handover.

* * * * *